United States Patent
Klee et al.

[11] 3,977,194
[45] Aug. 31, 1976

[54] DEVICE FOR FINE ADJUSTMENT OF THE TOOL SEAT OF A MACHINE TOOL

[75] Inventors: Gerhard Klee; Dieter Eysel, both of Frankfurt am Main; Wilfried Gerk, Waldacker, all of Germany

[73] Assignee: Samson Apparatebau AG, Frankfurt am Main, Germany

[22] Filed: Dec. 11, 1974

[21] Appl. No.: 531,774

[30] Foreign Application Priority Data
May 31, 1974 Germany............................ 2426409

[52] U.S. Cl. ................................. 60/547; 417/385; 279/4
[51] Int. Cl.[2] ......................................... B60T 13/00
[58] Field of Search ............. 60/533, 542, 543, 544, 60/547; 417/383, 1, 385, 398; 92/98 D; 279/4

[56] References Cited
UNITED STATES PATENTS

| | | |
|---|---|---|
| 3,113,806 | 12/1963 | Cripe ................................. 60/547 X |
| 3,243,960 | 5/1966 | Hammond ........................ 60/533 X |
| 3,747,337 | 7/1973 | Gardner et al..................... 60/547 X |

FOREIGN PATENTS OR APPLICATIONS
775,321   5/1957   United Kingdom................... 60/547

Primary Examiner—Martin P. Schwadron
Assistant Examiner—H. Burks, Sr.
Attorney, Agent, or Firm—Toren, McGeady and Stanger

[57] ABSTRACT

A pressure transducer formed as a three-dimensional body is rendered flexible in order to permit fine adjustment of a machine tool seat formed thereon by the formation of holes and slits in the transducer body which cause portions of the body to operate as spring-like webs. An expansion box is located within the transducer and a pressure transmitter separate therefrom is connected thereto to enable pressure from the transmitter to be applied to the expansion box to cause flexing of the transducer body and fine adjustment of the position of the tool seat. Because of the particular arrangement of the holes and slits in the transducer body, the tool seat is able to be moved parallel to itself during the adjustment process.

2 Claims, 3 Drawing Figures

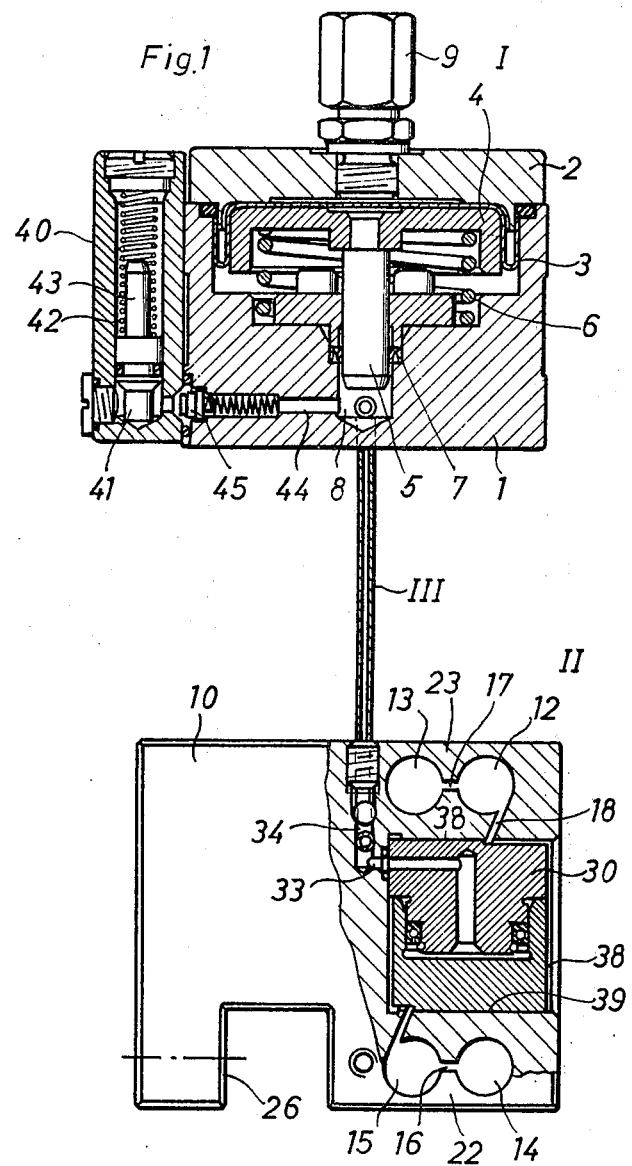

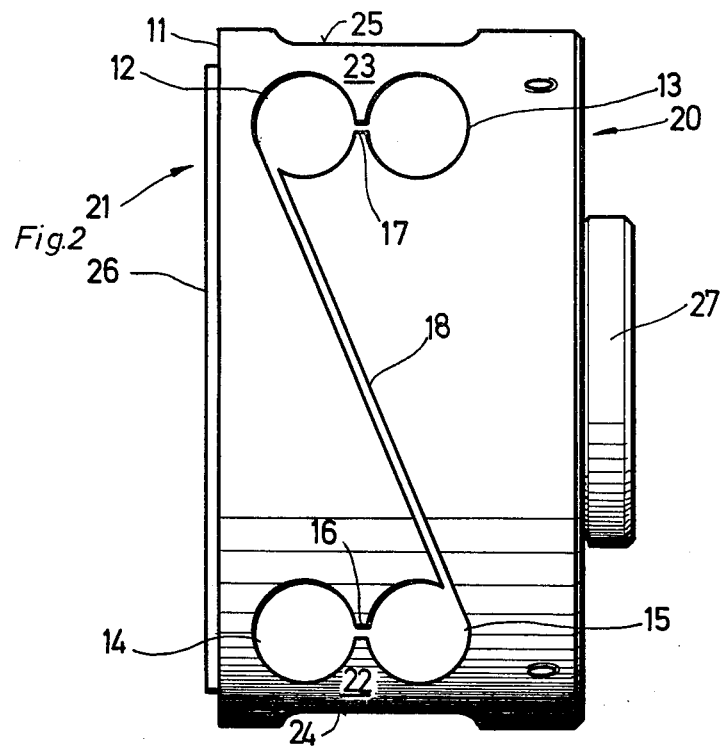
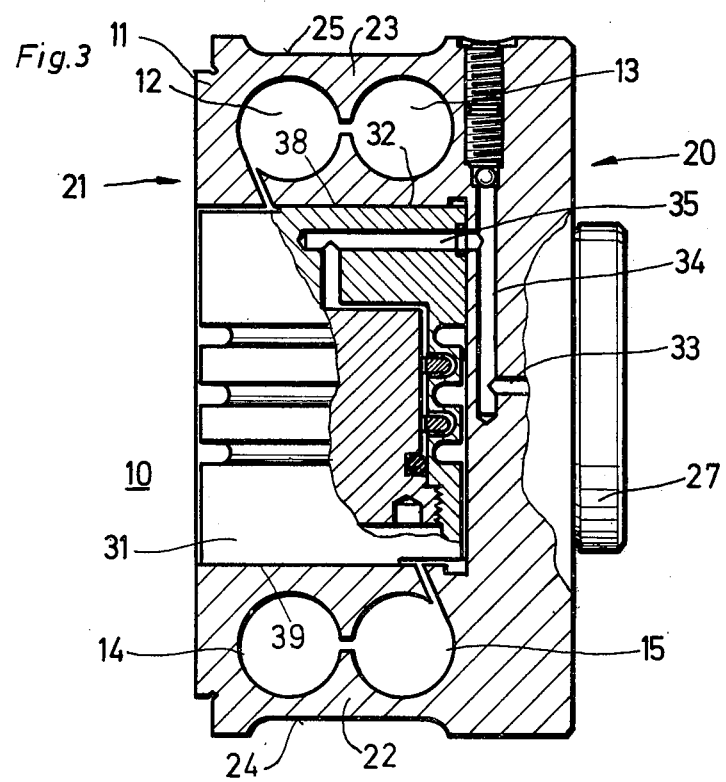

DEVICE FOR FINE ADJUSTMENT OF THE TOOL SEAT OF A MACHINE TOOL

BACKGROUND OF THE INVENTION

The present invention relates generally to machine tools and more particularly to a device for enabling fine adjustment of the tool seat of a machine tool. The device of the present invention is of the type comprising a pneumatic-hydraulic pressure transmitter connected with a pressure transducer which operates as a positioning member to enable adjustment of a tool seat in response to pressure applied thereto. In devices of this type, the pressure transmitter includes a hydraulic cylinder having a hydraulic piston in sealed sliding engagement therein operating in fixed engagement with a pneumatic piston sealed by means of a flexible diaphragm which is clamped between the pneumatic piston and the housing of the pressure transmitter. Pressure applied to the pressure transducer operates by means of a spring force to adjustably position a tool seat which may be mounted upon the pressure transducer for movement parallel to itself by means of at least one expansion box arranged within the pressure transducer.

In a known device of this type, the pressure transducer or positioning member may consist of two flange-like parts interconnected by a pair of leaf springs having a pair of extensions which are in opposed relationship facing each other. Two adjacent expansion boxes are disposed therebetween and the pressure transmitter is accommodated in a shank having a face upon which the positioning member is flanged.

Designs of this type have been found costly. Their various components are difficult to produce and manufacture because they involve complicated shapes. Furthermore, assembly of such devices requires much time. The pairs of expansion boxes must each have identical positioning properties. Also, the field of application of this type of device is limited because of the necessity for maintaining a fixed configuration of the pressure transducer and positioning member. Due to the fact that the pressure transmitter and the positioning member are directly interconnected, and therefore form a relatively large mass, the mass forces of the machine tool components supporting the device cause error in the positioning signal and, as a result, error in the associated movements. Although balancing weights may provide a remedy of sorts, they cause the production problems to become even more difficult. In this connection it should be recognized that the interference factors of fine adjustment devices of this type are inherently of a magnitude in the order of their travel distances.

Accordingly, the present invention is aimed toward provision of a device enabling fine adjustments of tool seats which is arranged in a manner permitting the components thereof to be formed as separate modules which may be operatively combined in a variety of desired modes. The invention is intended to enable the components to be structured in a simpler configuration and one which is easier to assemble and manufacture. By utilization of the present invention the components thereof may be combined in such a manner that when they are applied in connection with the moving parts of a machine tool, reactions due to the resultant mass forces upon the positioning signal are greatly reduced as a result of advantages flowing from the particular design and arrangement of the pressure transmitter and positioning member. Furthermore, the invention permits avoidance of error in the positioning signal which may be caused by leakage losses in the pressure transducer.

SUMMARY OF THE INVENTION

Briefly, the present invention may be described as an improvement in a device for the fine adjustment of a tool seat of a machine tool which includes a pneumatic-hydraulic pressure transmitter, a pressure transducer adapted to act as a positioning member for the tool seat, and means connecting the pressure transducer with the pressure transmitter to receive pressure signals therefrom. The pressure transmitter is structured to include a housing, an hydraulic piston, an hydraulic cylinder having the piston mounted in sealed sliding engagement therewith, a pneumatic piston fixed to move with the hydraulic piston, and a flexible diaphragm extending in sealing engagement between the housing of the pressure transmitter and the pneumatic piston to enable sealed slidable movement therebetween whereby pressure from the pneumatic piston to the hydraulic piston may be transmitted through the hydraulic cylinder to an expansion box located within the pressure transducer. The pressure transducer is constructed to include means responsive to the expansion box capable of developing a spring-like response for positioning the tool seat as a result of the action of the expansion box in response to pressure from the pressure transmitter. In the present invention, the means producing the spring-like force are formed from a part of the body of the pressure transducer itself by configuring the pressure transducer as a three-dimensional body having the tool seat defined thereon and by providing holes formed in the transducer body to enable expansion and contraction of the body itself. The holes are disposed in pairs located on opposite sides of the transducer body and they extend therethrough in directions parallel to the tool seat. Each pair of holes is juxtaposed with one hole located closer to the tool seat than the other hole of the pair. Each of the holes of a pair is interconnected by an intrapair slit extending therebetween connecting the superficies of the holes. Furthermore, each pair of holes is interconnected by an interpair slit which extends between the hole of one of the pairs which is closest to the tool seat and the hole of another pair which is furthest from the tool seat. This interpair slit connects the superficies of the holes and as a result of the configuration of the holes and slits portions of the transducer body are able to operate as spring-like webs imparting flexibility to the transducer body. The transducer body has formed therein a recess extending perpendicularly to the direction in which the holes are formed and the expansion box is positioned within the recess to apply to the transducer body forces in directions perpendicular to the direction in which the holes extend therethrough. Pressure transmitted from the pressure transmitter to the expansion box of the transducer body enable the tool seat to be moved parallel to itself thereby to affect fine adjustment of the positioning thereof.

As a result of the structure of the present invention, the pressure transmitter and the pressure transducer may be formed as separate bodies interconnected by a conduit enabling pressure transmission therebetween. Formation of the conduit as a flexible coupling enables movement of the pressure transducer relative to the pressure transmitter. The pressure transducer body may be a cuboid or, alternatively, it may be formed in a cylindrical configuration.

The pressure transmitter is equipped with means for replenishing fluid leakage from the hydraulic cylinder by providing within the pressure transmitter a reservoir of hydraulic pressure fluid. Check valve means are interposed between the reservoir and the hydraulic cylinder and a spring loaded piston is biased to act upon the reservoir so that when the check valve opens hydraulic fluid may be replenished into the hydraulic cylinder. The check valve operates in response to pressure in the hydraulic cylinder and opens when said pressure drops below a predetermined level.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there are illustrated and described preferred embodiments of the invention.

DESCRIPTION OF THE DRAWINGS

In the drawings:

FIG. 1 is a side view partially in section showing the device according to the present invention and depicting the pressure transmitter and the pressure transducer or positioning member;

FIG. 2 is a side view of another embodiment of the pressure transducer of FIG. 1; and FIG. 3 is a side view partially sectioned of the transducer of FIG. 2.

DETAILED DESCRIPTION OF THE PREFERRED EMBODIMENTS

Referring now to the drawings, wherein like reference numerals are used to refer to similar parts throughout the various figures thereof, the present invention is shown as embodied in a device adaptable for fine adjustment of a tool and comprising a pressure transmitter I and a pressure-to-motion transducer II acting as a positioning member which communicates with the pressure transmitter I through a conduit or pressure line III. It will be noted that the transmitter I and the transducer or positioning member II are formed as separate assemblies which are separate entities joined together by the conduit III.

The pressure transmitter I may be formed as a cuboid or it may comprise a cylindrical configuration. The transmitter I comprises a housing 1 having a housing cover 2 between which there is clamped one side of a flexible diaphragm 3. The other side of the diaphragm 3 is connected to a pneumatic piston 4 which is affixed to a hydraulic piston 5. A spring 6 maintains the pistons 4 and 5 in their normal positions shown in FIG. 1 with the hydraulic piston 5 being engaged in sealed slidable engagement within a cylinder chamber 8 by packings or sealing means 7. A connector 9 for admitting compressed air to the pneumatic piston is provided.

The pressure conduit III connects the cylinder chamber 8 with the positioning member II which, in the embodiment shown in FIG. 1 is depicted in the form of a cuboid and which, in the embodiment shown in FIGS. 2 and 3, comprises a housing 10 having a cylindrical configuration.

Referring to the pressure transducer or positioning member shown in FIGS. 2 and 3, the symmetrical housing 10 comprises a bushing shaped cylinder jacket 11 having formed therethrough four parallel holes 12, 13, 14 and 15. The holes are arranged in pairs with each pair being located on opposite sides of the housing 10. The holes are formed to extend generally tangentially to the cylinder superficies. The holes of each pair are interconnected with each other by a radial joint or slit 16, 17, with the hole pair 14 – 15 being interconnected by slit 16 while the hole pair 12 – 13 is interconnected by a slit 17. The slits 16 and 17 may be referred to as intrapair slits inasmuch as they extend within a given pair of holes between each of the holes of a pair.

The device also includes a tangential slit 18 which extends between the superficies of two of the holes of different pairs and interconnects the hole 12 with the hole 15. Inasmuch as the slit 18 extends from one pair of holes to another, it is referred to herein as an interpair slit.

The housing 10 shown in FIGS. 2 and 3 includes a base surface or side 20 and a tool attachment side 21. It will be noted that the holes of each pair of holes are located so that one of said holes is closer to the tool attachment side 21 than the other. For example, it will be seen that hole 12 is closer to the tool attachment side 21 than hole 13 and that hole 14 is closer thereto than hole 15. It will further be seen that the interpair slit 18 extends between one hole 12 of the pair of holes 12 –13 which is closest to the side 21 and another hole 15 of the hole pair 14 – 15 which is furthest away from the tool attachment side 21.

As a result of the formation of the holes 12–15 the housing 10 is formed to define on opposite sides of the cylindrical jacket 11 a pair of webs 22 and 23 havng formed therein, respectively, a recess 24 or 25 by machining or chip removal. The provision of the recesses 24 and 25 renders the stiffness of the webs 22, 23 variable or adjustable and the webs 22, 23 may serve as spring members or spring elements of the device.

A flange-like extension 27 is provided on the base surface 20 to serve as a chuck for the housing 10 which operates as a tool holder, for example in a drilling spindle. The tool attachment side 21 includes a locking ring 26 having three tapped holes (not shown) which serve for the attachment of a tool (not shown).

An expansion box 30 having rounded faces 31 and 32 is mounted to the base surface 20 by means of screws 29 which are of a known type, and it is enclosed within the housing 10 by an inner cylindrical surface thereof. The expansion box 30 is supplied with a pressure fluid by means of a system of holes 33, 34.

The face 32 is supported against a side 38 of the housing 10 which is fixed to the base surface 20 and the face 31 is supported against a side 39 which is joined elastically to the base surface only through the web 23 so that the tool attachment side can move transversely relative to the base side upon expansion of the expansion box. However, due to the fact that the tool attachment side is also joined elasticallly to the base side by the web 22, this movement takes place parallel to the line of symmetry of the housing 10 which serves as a tool holder, i.e., parallel to the surface of the chucking plate 26.

In other words, the webs 22 and 23 produced by the formation of the slit holes form a parallel spring of great stiffness enabling, with a high degree of accuracy, a parallel movement of the tool attachment plate relative to the chucking plate.

In FIG. 1 identical components have the same reference symbols. Here again, the tool seat 26 shown in the drawing plane can be moved parallel to itself, i.e. to the right face, if a pressure medium is supplied to the expansion box 30 through line III and the system of holes 33, 34.

Connected with the housing 1 of the pressure transmitter I is a refilling device 40 through which leakage losses of the hdraulic piston 5 are constantly replenished. For this purpose, there is provided a fluid reservoir 41 which is maintained under pressure constantly by means of a piston 43 biased by a spring 42. When the pressure within the chamber 8 drops below a predetermined value on the return stroke of the hydraulic piston 5, a check valve 45, which is located in a supply line 44 between the reservoir 41 and the cylinder 8, will open and thereby admit fluid, such as oil, from the reservoir 41 to flow through the conduit 44 into the cylinder chamber 8.

The positioning member shown in FIGS. 2 and 3 is adapted preferably to receive a drill which involves a high speed component. On the other hand, the positioning member of the embodiment depicted in FIG. 1 is adapted to receive a turning tool. Therefore, the work piece performs a high speed rotary motion.

The assemblies I and II may be juxtaposed during their operation with their mutually facing sides directly adjoining each other. However, they may be spaced apart as shown, or they may also be arranged and positioned in different planes. Where the assemblies are arranged in an adjoining relationship, a hose connecting both assemblies together will suffice as a pressure conduit. However, where other arrangements are desired, the pressure conduit III must be flexible in order to enable the desired positioning and coordination of the arrangement between the pressure transmitter I and the positioning member II. As a matter of course, the cylindrical positioning member shown in FIGS. 2 and 3 may also be used in place of the positioning member II, thereby enabling achievement of the aforementioned advantages when the device is applied to drill presses. In such a case, the pressure transmitter I may also be of a cylindrical design.

If the connector 9 is supplied with air pressure corresponding to a desired correction value, the pneumatic piston 4 will apply pressure against the hydraulic piston 5 to generate an hydraulic pressure amplified by the ratio of the two piston areas. The pressure will act through the conduit III upon the expansion box and, therefore, upon the positioning member.

The elastic web elements 22 and 23 are designed with a stiffness which will enable a well defined distance of movement between 0 and 200 mu which is coordinated as exactly as possible with each pressure value within a range, for example, from 0.2 to 4 kp/cm$^2$, as a function of the input values within this range. Accordingly, the positioning member, and with it the tool, will be moved very small distances with the hydraulic working pressure being greater by a factor of 100 to 1,000 than the pressure of the pneumatic axuiliary energy.

From the foregoing it will be seen that the present invention provides a significant improvement over the structures previously known and overcomes many of the problems attendant thereto in that the positioning member is formed as a cuboid or with a cylindrical configuration having a housing which provides a tool seat with holes which form stiff surface elements acting as a parallel spring joint disposed in pairs and extending parallel to the seat. The juxtaposed holes of each pair of holes are connected with each other by an intrapair slit extending along their superficies and the holes of the pairs of holes obliquely opposite each other are interconnected by another interpair slit connecting their superficies while the expansion box acts upon the surface elements and is disposed in a housing recess extending perpendicularly to the holes. The pressure transmitter and the positioning member, with the interposition of a rigid or flexible pressure conduit therebetween, are interconnectable in different spatial coordinants directly or decoupled regarding their masses.

By another characteristic of the invention, the hydraulic cylinder located in the pressure transmitter housing communicates through a hole containing a check valve with a pressure medium reservoir disposed in the housing and acted upon by a spring loaded piston.

In the integrally designed positioning member according to the present invention, inaccuracies due to motion and friction between individual assembled parts, as might occur in known positioning devices, are eliminated. The spring stiffness of the surface elements formed by the holes is so great that strict linearity between the magnitude of the pressure and the deflection of the tool seat, within the range of operation herein contemplated, is assured. If the housing is cylindrical, the positioning member may be a simple symmetrical turned part, except for the expansion box.

In its configuration and size, the pressure transducer matches the positioning member. Due to the design of the positioning member and of the pressure transducer as separate assemblies, they may be applied as separate units or as one preassembled unit, depending upon the machine tool which is to be equipped with these elements.

With this arrangement, it is possible to overcome many difficult space problems and in particular it is possible to equip drill presses with such devices because, in this particular case, the positioning member, connected to the pressure transducer by a flexible pressure line, has a smaller mass and requires little space so that, for example, the mass of a hydraulically guided copying finger of a copying device or of a drilling tool is not substantially increased.

Furthermore, in accordance with the invention, the refilling device on the pressure transducer allows several million hydraulic piston cycles without changing the accuracy of the fine adjustment of which the device is capable despite unavoidable piston packing leakage losses.

While specific embodiments of the invention have been shown and described in detail to illustrate the application of the inventive principles, it will be understood that the invention may be emdodied otherwise departing from such principles.

What is claimed is:

1. A device for fine adjustment of a tool seat of a machine tool, comprising in combination:

a pneumatic-hydraulic pressure transmitter, a pressure transducer formed as a cuboid and adapted to act as a positioning member for said tool seat;

said pressure transmitter and said pressure transducer formed as separate bodies;

flexible coupling means connecting said pressure transducer to said pressure transmitter to receive pressure therefrom and to enable relative movement therebetween;

said pressure transducer including
means defining a tool seat on said pressure transducer,
expansion box means within said pressure transducer, and
means adapted to effect adjustable positioning of said tool seat as a result of action of said expansion box means in resonse to pressure from said pressure transmitter;

said pressure transmitter including
a housing,
an hydraulic piston,
an hydraulic cylinder having said piston mounted in sealed sliding engagement therewith,
a pneumatic piston fixed to said hydraulic piston,
a flexible diaphragm extending in sealing engagement between said housing and said pneumatic piston to enable sealed slidable movement therebetween whereby pressure applied from said pneumatic piston to said hydraulic piston may be transmitted to said expansion box means to effect adjustable movement of said tool seat,
a reservoir of hydraulic pressure fluid,
check valve means interposed between said reservoir and said hydraulic cylinder, and
a spring loaded piston biased to introduce said fluid into said cylinder through said check valve means,
said check valve means operating to permit hydraulic fluid flow to said cylinder when the pressure therein drops below a predetermined level thereby to replenish leakage of fluid therefrom;

said pressure transducer being configured as a three dimensional body having holes formed therein to enable expansion and contraction of said body, said holes being disposed in pairs located on opposite sides of said transducer body and extending therethrough in directions parallel to said tool seat, with each of said pairs of holes being juxtaposed with one hole closer to said tool seat than the other each of the holes of a pair being interconnected by an intrapair slit extending therebetween connecting their superficies, with each of said pairs being interconnected by an interpair slit extending between the hole of one pair closer to said tool seat and the hole of another pair furthest from said tool seat and connecting their superficies; said transducer body having a recess defined therein with said expansion box means being positioned within said recess to apply to said transducer body forces in directions extending transverse to the direction in which said holes extend therethrough;

whereby said transducer body is formed with flexible webs acting as spring means enabling movement of said tool seat while maintaining said tool seat parallel to itself.

2. A device according to claim 1 wherein said pressure transducer body is formed with a cylindrical configuration.

* * * * *